(12) United States Patent
Bechtold

(10) Patent No.: US 9,174,572 B2
(45) Date of Patent: Nov. 3, 2015

(54) ELECTRIC HORN DEVICE FOR A VEHICLE AND VEHICLE

(71) Applicant: GM GLOBAL TECHNOLOGY OPERATIONS LLC, Detroit, MI (US)

(72) Inventor: Juergen Gerhard Bechtold, Birkenau (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 145 days.

(21) Appl. No.: 13/935,026

(22) Filed: Jul. 3, 2013

(65) Prior Publication Data

US 2014/0015655 A1    Jan. 16, 2014

(30) Foreign Application Priority Data

Jul. 5, 2012 (DE) .......................... 10 2012 013 392

(51) Int. Cl.
| | |
|---|---|
| *B60Q 1/00* | (2006.01) |
| *B60Q 5/00* | (2006.01) |
| *G10K 9/13* | (2006.01) |
| *G10K 9/22* | (2006.01) |

(52) U.S. Cl.
CPC .. *B60Q 5/00* (2013.01); *G10K 9/13* (2013.01); *G10K 9/22* (2013.01)

(58) Field of Classification Search
CPC ............... B60Q 5/00; G10K 9/13; G10K 9/22
USPC ........... 340/425.5, 384.1, 384.4, 384.6, 388.1
See application file for complete search history.

(56) References Cited

U.S. PATENT DOCUMENTS

| | | | |
|---|---|---|---|
| 4,004,111 A * | 1/1977 | Turlais | ............................ 367/13 |
| 4,802,068 A | 1/1989 | Mokry | |
| 5,931,494 A * | 8/1999 | Eusebi | .......................... 280/731 |
| 6,317,033 B1 | 11/2001 | Kobayashi et al. | |
| 6,351,543 B1 | 2/2002 | Lenhard-Backhaus et al. | |
| 2007/0221116 A1 | 9/2007 | Kruse | |

FOREIGN PATENT DOCUMENTS

| | | |
|---|---|---|
| DE | 159164 C | 3/1905 |
| DE | 102007035968 A1 | 2/2009 |
| DE | 102010010655 A1 | 9/2011 |
| GB | 1046747 A | 10/1966 |

OTHER PUBLICATIONS

German Patent Office, German Patent Search Report for Application No. 102012013392.8, dated Jan. 25, 2013.

* cited by examiner

*Primary Examiner* — Daryl Pope

(74) *Attorney, Agent, or Firm* — Ingrassia Fisher & Lorenz PC

(57) ABSTRACT

Electric horn devices for a vehicle and vehicles with the electric horns are provided. An electric horn device includes a housing that is tightly sealed, a housing section within the housing, and a membrane element within the housing and configured to generate a sound. An elastic pressure equalizing element is adapted to allow pressure equalization in the housing.

18 Claims, 2 Drawing Sheets

ELECTRIC HORN DEVICE FOR A VEHICLE AND VEHICLE

CROSS-REFERENCE TO RELATED APPLICATION

This disclosure claims priority to German Patent Application No. 10 2012 013 392.8, filed Jul. 5, 2012, which is incorporated herein by reference in its entirety.

TECHNICAL FIELD

The technical field relates to an electric horn device for a vehicle, in particular for a motor vehicle. The technical field further relates to a vehicle with such an electronic horn device.

BACKGROUND

DE 10 2007 035 968 A1 describes a fanfare horn for a motor vehicle. The fanfare horn has a drive exhibiting an electric coil for a diaphragm. In addition, the fanfare horn has a housing for accommodating the electromagnetic drive and diaphragm. The housing here is made completely out of plastic, and serves as a magnetic ground ring for the electric coil for the electromagnetic drive.

Against this backdrop, at least one object herein is to provide a horn device for a vehicle with protection against water penetration In addition, other objects, desirable features and characteristics will become apparent from the subsequent summary and detailed description, and the appended claims, taken in conjunction with the accompanying drawings and this background.

SUMMARY

According to an exemplary embodiment, an electric horn device for a vehicle, in particular a motor vehicle, is provided with a housing having a housing section and membrane element. The housing is tightly sealed and the membrane element is provided to generate a sound, with at least one elastic pressure equalizing element designed to allow pressure equalization inside the housing.

In the electric horn device according to an embodiment, the housing is tightly sealed by the elastic pressure equalizing element. In particular, a pressure equalization opening provided strictly for pressure equalization can be omitted. This effectively protects the housing against water penetration. In addition, such horn devices can also be built into areas of the vehicle where they might come into contact with dirty water, for example.

In an exemplary embodiment, the elastic pressure equalizing element is an elastic pressure equalizing volume, for example, an elastic bellows or elastic balloon. The elastic bellows or elastic balloon effects a pressure equalization when the membrane element is made to oscillate, or, for example, if the air volume inside the housing is quenched, e.g., through exposure of the horn to splashing water.

In another embodiment, the elastic pressure equalizing element is an elastic membrane. The elastic membrane also effects a pressure equalization when the membrane element is made to oscillate, or, for example, if the air volume inside the housing is quenched. In addition, the elastic membrane is easy and cost-effective to manufacture. The housing borehole selected for the pressure equalizing membrane must be larger than the one for a bellows or balloon to be able to provide a comparable equalizing air volume.

According to an additional embodiment, the elastic pressure equalizing element consists of an elastic material, for example an elastomer. The advantage to elastomers is that they are not susceptible to corrosion, and are also simple and comparatively inexpensive to process.

In a further embodiment, the housing section and/or membrane element consist of a corrosion-resistant material, e.g., a corrosion-resistant metal or corrosion-resistant metal alloy. This makes the horn device especially suitable for use in an area of the vehicle exposed to dirty water.

According to an additional embodiment, the housing section has an electric coil and first magnetic element, which is partially accommodated in the electric coil. The membrane element further has a second magnetic element, which immerses at least partially into the electric coil.

According to an additional embodiment, the electric horn device has at least one electrical outlet on the housing section. The electrical outlet is here tightly joined with the housing section. This provides further assurance that no water will penetrate into the housing, for example.

In another embodiment, the housing is designed without a ventilation or pressure equalization opening. This further simplifies the manufacture of the housing, and lowers the manufacturing costs.

The above embodiments and further developments can be combined with each other to the extent reasonable. Additional possible embodiments, further developments and implementations also encompass combinations of features of the electronic horn device described above or below in relation to the exemplary embodiments that have not been explicitly mentioned. In particular, the expert will here also add individual aspects as improvements or enhancements to the respective basic form of the electronic horn device contemplated herein.

BRIEF DESCRIPTION OF THE DRAWINGS

The various embodiments will hereinafter be described in conjunction with the following drawing figures, wherein like numerals denote like elements, and wherein.

DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
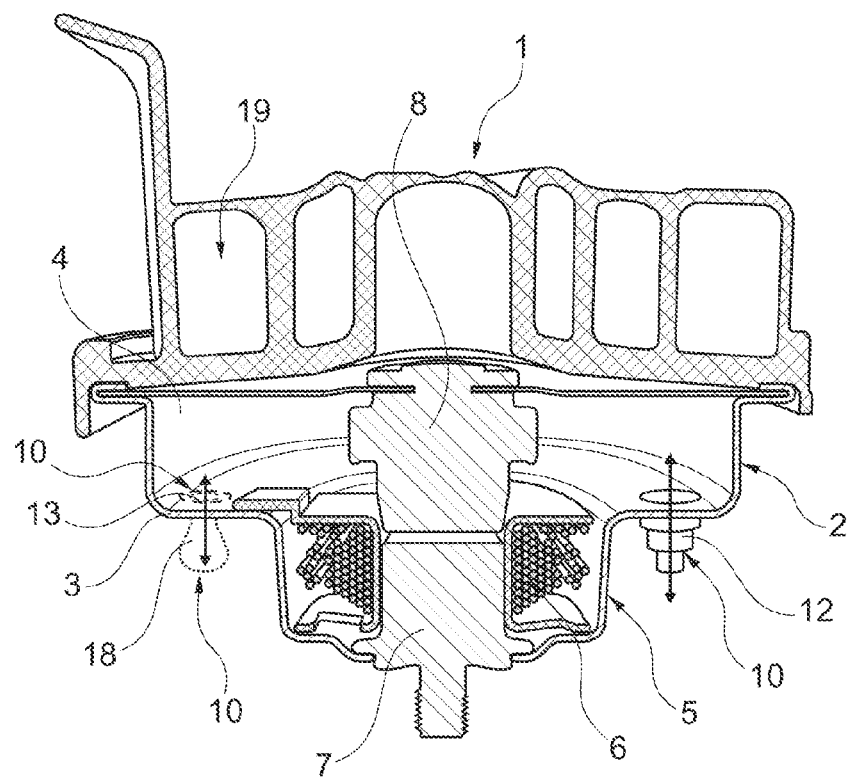
FIG. 1 is a sectional view of an electric horn device according to an embodiment.

FIG. 1 presents a sectional view of an electric horn device 1 according to an exemplary embodiment.

In order to satisfy the legal requirements placed on sound pressure levels, electric horns must often be placed in motor vehicles in such a way as to only be slightly protected against exposure to all weathering conditions. When driving through pools of water, they might also be exposed to splashing water, and in the worst case scenario even become submerged. Commercially available horns here run the risk of partially or entirely losing their function due to the penetration of dirty water caused by an aspiration effect produced by a quenching of the air volume present inside an electronic housing of the horn, or corrosion between a metal membrane and spiral horn. While shielding measures can reduce the splashing and submerging problem, they only inadequately protect against penetration by spray mist or droplets during exposure to rain.

Therefore, embodiments herein provide a horn device 1 that is resistant to the introduction of dirty water.

The electric horn device 1 has a housing 2. The housing 2 here has a housing section 3 and membrane element 4, which comprises the housing floor. The membrane element 4 here consists of metal or a metal alloy, for example, wherein the metal or metal alloy is, for example, corrosion-resistant. However, the electronic horn device 1 is not limited to such a metal membrane element 4, and the membrane element 4 can be made out of another suitable material, in particular corrosion-resistant material, for example a corrosion-resistant plastic or fiber-reinforced plastic, etc.

The housing section 3 has a receptacle 5, for example in the form of a depression, for accommodating the electronics of the horn device 1, for example an electric coil 6, as depicted in the exemplary embodiment on FIG. 1. In addition, the housing section 3 incorporates a first magnetic element 7, e.g., which for the most part is accommodated in the electric coil 6. The membrane element 4 is in turn connected with a second magnetic core element 8 referred to as a nucleus, which dips partially into the coil 6 in the built-in state, as depicted in the exemplary embodiment on FIG. 1.

The housing section 3 is further provided with at least one electrical outlet 9, e.g., which is connected with the coil 6 inside the housing 2 in order to apply a current to the coil 6 when needed. For example, an oscillating circuit can here be generated, as described below. When a current is applied to the coil 6, the coil 6 generates a magnetic force in the first magnetic element 7 that attracts the nucleus along with the membrane, thereby interrupting a spring contact switch to the coil, so that the nucleus along with the membrane swing back, thus closing the spring contact once more, and again become electromagnetically attracted, as denoted with a double arrow on FIG. 1. As a result, the membrane element can oscillate, and thereby generate a sound pressure.

In the exemplary embodiment shown on FIG. 1, the membrane element 4 and housing section 3 consist of a corrosion-proof metal or corrosion-proof metal alloy, and are preferably tightly joined together, for example in a liquid-tight manner. To this end, the housing section 3 is crimped around the circumference of the membrane element 4, as depicted in the exemplary embodiment on FIG. 1. However, any other type of tight bond can be provided between the housing section 3 and membrane element 4, e.g., the housing section 3 and membrane element 4 can be welded, soldered, screwed and/or adhesively bonded with each other, to name just a few examples. In like manner, additional sealants can optionally be provided, for example a rubber seal (not shown) between the housing section 3 and membrane element 4.

In addition, in an embodiment, the first magnetic core element 7 is also tightly joined with the housing section 3. To this end, the first magnetic core element 7 is crimped with the housing section 3, for example. However, any other type of connection between the housing section 3 and first magnetic core element 7 can be provided for tightly joining the two parts. Additional sealants, e.g., a rubber seal, can here optionally be provided between the housing section 3 and first magnetic core element 7.

The nucleus 8 is also tightly joined with the membrane element 4, for example via crimping. Any other type of connection can here also be provided between the membrane element 4 and nucleus 8 for tightly joining the two parts. In like manner, additional sealants and/or adhesives can optionally be provided between the membrane element 4 and nucleus 8.

In addition, the horn device 1 has an elastic pressure equalizing element 10 for equalizing pressure when the membrane element 4 is made to oscillate or oscillates. The advantage to this is that a previously present pressure equalizing or vent opening, e.g., a borehole having an exemplary diameter of D=0.5 mm, in the housing section 3 can be eliminated, so that the housing 2 comprised of the housing section 3 and membrane element 4 as the housing floor can be given a tight design, in particular a liquid-tight and/or gas-tight design. This prevents water from undesirably getting into the housing 2.

The elastic pressure equalizing element 10, for example an elastic bellows 12, can act as a pressure equalizing element for the housing 2 on the one hand, and simultaneously replace the previous pressure equalizing or vent opening (not shown) on the other, for example, so that no water can penetrate into the housing interior through the opening.

For example, the elastic pressure equalizing element 10 is an elastic pressure equalizing volume, e.g., the elastic bellows 12 or an elastic balloon 18, as denoted in the exemplary embodiment on FIG. 1 with a dotted line. When the membrane element oscillates or moves back and forth as denoted by the arrow on FIG. 1, the elastic bellows or elastic balloon contracts and expands, thereby equalizing pressure differences in the housing. In addition, the elastic pressure equalizing element 10 and tight design for the housing 2 prevent the effect of aspiration into the housing 2, e.g., due to a sudden cooling of the air volume located in the housing 2 of the horn device 1 induced by splashing water.

In an exemplary embodiment, the elastic pressure equalizing element 10 is adjusted in such a way that the smallest and largest possible air volume can be reached inside the housing 2. This on the one hand allows the membrane element 4 to oscillate during operation when the horn device 1 is activated and/or when the air volume in the housing 2 is quenched or operationally heated, and thus expanded.

Instead of an elastic pressure equalizing volume 10, e.g., an elastic bellows 12 or an elastic balloon 18, the elastic pressure equalizing element 10 can also be an elastic membrane 13, as described previously, and denoted by a dashed line in the exemplary embodiment on FIG. 1. The elastic membrane 13 is here also tightly secured to the housing section 3, so that no water or moisture can penetrate into the housing 2 from outside.

As described previously, a large or sufficiently large opening must be provided in the housing section 3 in particular for the elastic membrane 13, so that the elastic membrane 13 can suitably equalize the pressure inside the housing 2 after tightly secured to the housing 2. The same also holds true for the bellows 12 and balloon 18. For example, an existing pressure equalizing or vent opening that is too small can be enlarged in a correspondingly suitable manner to attach the elastic bellows 12 or elastic balloon 13 for pressure equalization in the housing 2.

As a consequence, the outwardly tightly sealed housing 2 cannot corrode inside, even if the housing section and/or membrane element consists of a non-corrosion-resistant instead of a corrosion-resistant material.

The elastic pressure equalizing element 10, for example the elastic bellows 12, the elastic balloon 18 or the elastic membrane 13, etc., consists of an elastic material, for example an elastomer or some other suitable elastic material.

In addition, in an embodiment, the horn device 1 exhibits a spiral horn 19, which is provided on the outside of the membrane element 4, and secured to the housing 2 in an airtight or soundproof manner.

If water penetrates at the trumpet of the spiral horn, it can make its way as far as the space between the membrane and spiral horn center, which tapers down to a gap. Since the membrane element 4 preferably consists of a corrosion-resistant material, the membrane element 4 can also not outwardly corrode, even when water penetrates between the spiral horn 19 and membrane element 4. Any resultant deterioration in sound level is no longer present after drying. Since corrosion does not take place, the required function is permanently restored.

By providing the elastic pressure equalizing element 10 on the housing 2, the horn device 1 according to an embodiment makes it possible to tightly seal the housing 2 that incorporates the electronics, in particular in a liquid-tight and/or gas-tight manner. As a result, the penetration of dirty water into the housing 2 and electronics accommodated therein, e.g., the coil 6, can be reliably prevented, while simultaneously maintaining the oscillatory movement of the membrane element 4 or sound membrane plate.

Figure 2:
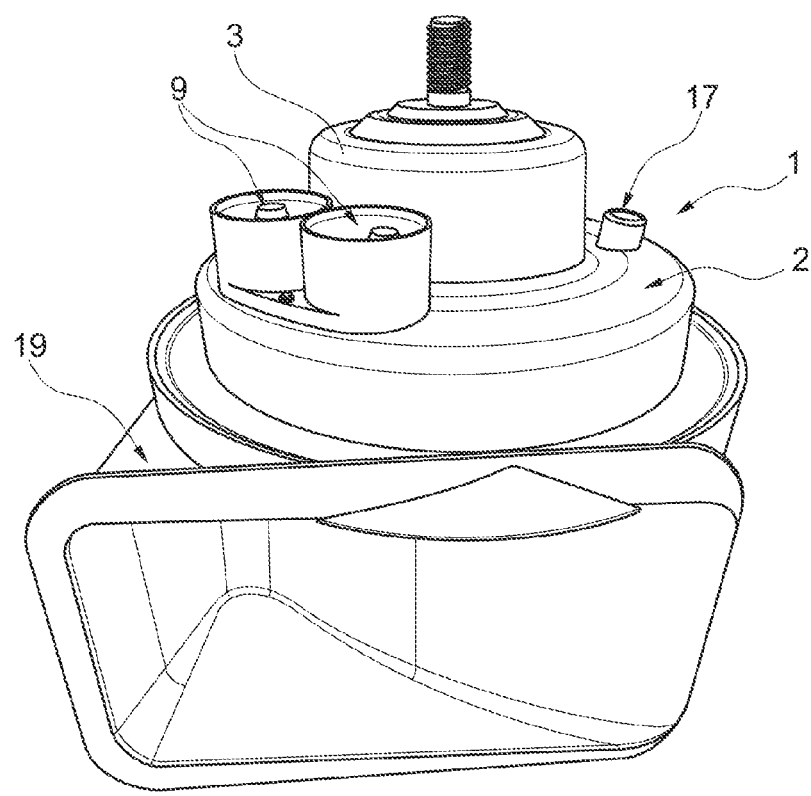
FIG. 2 is a perspective view of the electric horn device according to FIG. 1.

FIG. 2 further presents a perspective view of the electric horn device 1 according to FIG. 1, wherein the horn device 1 was here cut open in the longitudinal direction. The one half of the horn device 1 cut open in the longitudinal direction was here depicted previously on FIG. 1. The elastic pressure equalizing element is not shown on FIG. 2 to provide a clearer overview.

As may be gleaned from the exemplary embodiment of a horn device 1 shown on FIG. 2, the latter exhibits the housing 2, which incorporates the electronics, or at least part of the electronics, for activating the horn device 1. As described previously, the housing 2 here has the housing section 3 with the coil, as well as the membrane element as the housing floor. One or more terminals 9, for example for connecting the coil to a power source, are situated on the outside of the housing section 3, as depicted in the exemplary embodiment on FIG. 2. The respective terminal 9 is here preferably also sealed or tightly joined with the housing section 3, for example so that no dirty water can get past the terminal 9 and penetrate into the housing 2. Furthermore, the housing 2 exhibits the spiral horn 19, as well as at least one elastic pressure equalizing element (not shown).

Parts that are attached to the housing 2 or might cause leaks, e.g., the terminals 9, a screw 17 that secures a magnetic coil carrier inside the housing, etc., are preferably all sealed, so that the housing 2 is preferably completely or at least essentially tight. In the exemplary embodiment on FIG. 2, for example, the screw 17 is sealed by silicone. In particular, the housing 2 is at least completely liquid-tight or essentially liquid-tight. In like manner, the housing 2 can additionally also be gas-tight.

The provided elastic pressure equalizing element replaces the otherwise necessary pressure equalizing or vent opening. For example, such a pressure equalizing or vent opening is designed as a borehole, e.g., with a diameter of D=0.5 mm.

According to exemplary embodiments, a motor vehicle is provided with an electric horn device 1 that functions independently of where installed, e.g., in the engine compartment, etc., and under any weathering conditions.

This makes it possible to do without expensive shielding measures that had previously protected electric horns against environmental influences, and were intended to reduce the failure rate. Aside from their price, the disadvantage to such shielding measures is most often that they worsen the sound pressure level of the horns. It is nearly impossible to protect such previous horns against any and all contamination in the outside area.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An electric horn device for a vehicle, the electric horn device comprising:
    a housing that is tightly sealed;
    a housing section within the housing;
    a membrane element within the housing and configured to generate a sound, and
    an elastic pressure equalizing element coupled to a portion of the housing section and elastically deformable relative to the housing section to allow pressure equalization in the housing.

2. The horn device according to claim 1, wherein
    the elastic pressure equalizing element is an elastic bellows.

3. The horn device according to claim 1, wherein
    the elastic pressure equalizing element is an elastic balloon.

4. The horn device according to claim 1, wherein
    the elastic pressure equalizing element is an elastic membrane.

5. The horn device according to claim 1 wherein
    the elastic pressure equalizing element comprises an elastic material.

6. The horn device according to claim 5, wherein the elastic pressure equalizing element comprises an elastomer.

7. The horn device according to claim 1, wherein
    the housing section and/or membrane element comprise a corrosion-resistant material.

8. The horn device according to claim 1, wherein
    the housing section has an electric coil and first magnetic core element that is partially accommodated in the electric coil, and wherein the membrane element has a second magnetic core element that dips at least partially into the electric coil.

9. The horn device according to claim 1, further comprising
    an electrical terminal that is tightly joined with the housing section.

10. The horn device according to claim 1, wherein
    the housing is configured without a pressure equalizing or vent opening.

11. The horn device according to claim 1, wherein the vehicle is a motor vehicle.

12. The horn device according to claim 1, wherein the elastic pressure equalizing element is coupled to the housing section of the housing in such a way as to seal the housing.

13. A vehicle with an electric horn device comprising:
    a housing that is tightly sealed;
    a housing section within the housing;
    a membrane element within the housing and configured to generate a sound, and
    an elastic pressure equalizing element coupled to a portion of the housing section and elastically deformable relative to the housing section to allow pressure equalization in the housing.

14. The vehicle according to claim 13 wherein the vehicle is a motor vehicle.

15. The vehicle according to claim 13, wherein the elastic pressure equalizing element is an elastic bellows, an elastic balloon, or an elastic membrane.

16. The vehicle according to claim 13, wherein the elastic pressure equalizing element comprises an elastic material.

17. The vehicle according to claim 13, wherein the housing section and/or the membrane element comprises a corrosion-resistant material.

18. The vehicle according to claim 13, wherein the housing section has an electric coil and first magnetic core element that is partially accommodated in the electric coil, and wherein the membrane element has a second magnetic core element that dips at least partially into the electric coil.

* * * * *